Oct. 25, 1932. H. H. RUBIN Re. 18,635

ASSIST GRIP

Original Filed Nov. 23, 1928

INVENTOR
Herman H. Rubin
BY
Jenney Blair & Curtis
his ATTORNEYS

Reissued Oct. 25, 1932

Re. 18,635

UNITED STATES PATENT OFFICE

HERMAN H. RUBIN, OF NEW YORK, N. Y.

ASSIST GRIP

Original No. 1,703,321, dated February 26, 1929, Serial No. 321,410, filed November 23, 1928. Application for reissue filed April 9, 1930. Serial No. 442,906.

Figure 1:
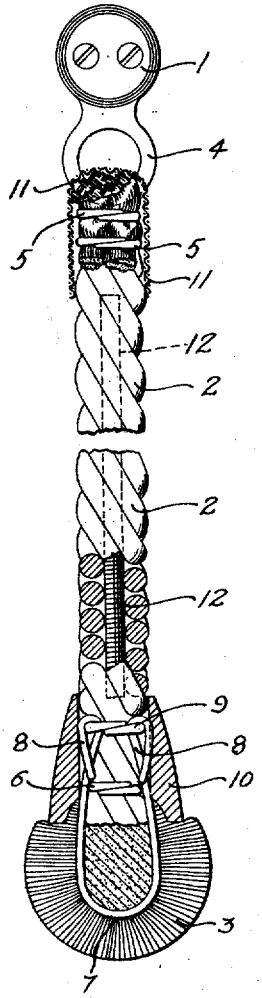
Figure 2:
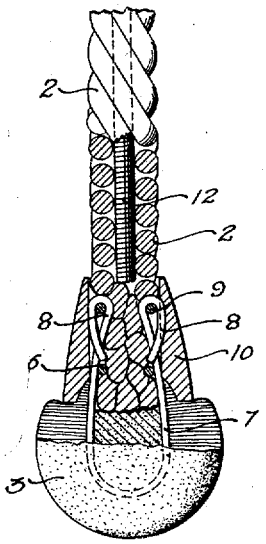

The present invention relates to an appliance adapted to be used by an occupant of a passenger conveyance such as an automobile to assist in controlling and steadying his movements within the vehicle especially when it is in motion. The device is secured to an interior wall thereof, one ordinarily being positioned at each end of the seats and in convenient position to be gripped by a person moving into or out of a seat. One object of my invention is to provide a holding device or grip of great durability and strength and which, while flexible, will retain its normal shape and pleasing appearance and will always remain in convenient operative position under varying conditions of use. One embodiment of my invention is illustrated in the drawing forming a part of this specification and in which Figure 1 is a side view with portions broken away and partly in section; and Figure 2, a fragmentary view partly in section of the lower or free end with outer portions of the completed device removed to show interiorly disposed portions partly in section.

Referring to the drawing, a device according to my invention comprises a bracket 1, a body portion and a grip portion 3. The bracket may be of any desired type but is preferably of the form illustrated and is equipped with a ring 4. The body portion consists of a plurality of twisted cords 2 or the like, the illustrated embodiment consisting of four cords twisted upon each other to form a rope-like member. In assembling, the ropes or cords are flattened a suitable distance at one end, as by raveling, and the raveled portion is passed through the ring 4 and bent down against a normal twisted portion of the cords and securely held in said position by means of a metallic binding ring 5 or the like. A ring 6 is pressed around the cords 2 close to their opposite or lower end so that the strands of cord projecting beyond said ring will form a relatively stiff and unyielding abutment against which to position a suitable grip member as 3, said ring also serving another purpose in combination with other elements hereinafter to be described.

Where a grip member such as a pompon is to be attached to the cords, a retaining member is provided preferably in the form of a metallic yoke 7 of wire. The free ends 8 thereof interlock with a clamping device or ring 9, such as a staple with its ends bent inwardly and in overlapping relation to form a ring or collar encircling the cord or support, which is preferably of some yielding or compressible material as knitted or twisted fabric, rope or the like. While there are various operative arrangements of interconnection between the ends 8 of yoke 7 and the clamp or ring 9, in a preferred embodiment, said ends 8 pass over ring 6 and through said ring 9. They are then bent back upon themselves toward the lower end of the body or supporting member. For greater security the ends 8 after being bent back are bent inwardly to a position between rings 6 and 9 so that the ring or clamp 6 will afford an abutment or stop adjacent and opposed to said bent back ends 8 of the yoke 7. Accordingly, if the ring 9 should slip or yield under pull, the ring 6 is in position to oppose disengaging movement of the bent back ends and therefore functions as a separate or auxiliary stop to prevent the pompon from slipping off. A molding or ferrule 10 of wood or other suitable material, conceals the end of the body and connecting devices associated therewith. As indicated in both figures, portions of the inner surface of ferrule 10 bear against the bent back or end portions 8 of yoke 7, thus retaining them securely in operative position. It will be obvious that the connecting means hereinabove described may be utilized to attach grips or ornamental terminal members other than pompons for like purposes.

The connection between the bracket 1 and the upper end of the cords is effectively concealed by means of a knitted covering 11 or the like, which is supplied chiefly for the purpose of improving the appearance of the device.

The appliance or assist grip thus far described would normally be flexible owing to the flexibility of the ropes or cords, but it is preferable to have a device of this character somewhat resilient in order that it may remain normally in extended position when not positively flexed. For this purpose, I utilize an elongated spring member of any suitable character or material. A preferred form of spring consists of a closely coiled steel wire 12, although it is contemplated that any other type of spring material such for example as celluloid, hard rubber, rawhide or other material may be employed. Whatever the type of spring, it is shorter than the total length of the cords 2 and is conveniently inserted between the twists or coils of said cords after the device has been assembled as thus far described. It is of course possible to remove the spring member by the reverse of the operation employed in inserting it so that the spring is therefore removable in case it suffers injury or deterioration. When assembled as described, the ends of the spring are not clamped or otherwise fixed so that it is free to move longitudinally in a limited range within the twists of the cords and therefore has some relative movement with respect thereto when the body portion is bent or distorted.

While I have described one effective mode of securing the grip member 3 to the support or cords 2, it is contemplated that my invention includes any manner of securing or affixing the grip member thereto.

In addition to the advantages hereinabove referred to in connection with the description of one form of my improved construction, there is the further advantage that my invention provides a relatively inexpensive product due chiefly to the saving of labor in connection with the fabrication of the body member or support, the ease with which the resilient or spring member may be inserted therein, and the simplicity of the connecting means between the grip 3 and the body or cords 2.

I claim as my invention:

1. An assist grip comprising a body portion, an attaching device at one end thereof, a pompon at the other end thereof and means for securing the pompon in operative position including a clamp encircling said body portion, a metallic connecting member embracing said pompon and having its ends interlocking with said clamp, and a second separate clamp spaced from the first mentioned clamp and positioned in the path of said connecting member ends as a stop to limit disengaging movement of the pompon due to slipping of the first mentioned clamp.

2. An assist grip comprising a body portion, an attaching device at one end thereof, a pompon at the other end thereof and means for securing the pompon in operative position including a clamp encircling said body portion, a separate clamp encircling the body portion and spaced from said first mentioned clamp, and a metallic connecting member embracing said pompon interlocking with the first mentioned clamp, and having its ends bent inwardly to a position between said clamps.

In testimony whereof, I have signed my name to this specification this 7th day of April, 1930.

HERMAN H. RUBIN.